No. 661,506. Patented Nov. 13, 1900.
C. C. FISHER.
PIPE COUPLING.
(Application filed Jan. 15, 1900.)
(No Model.)
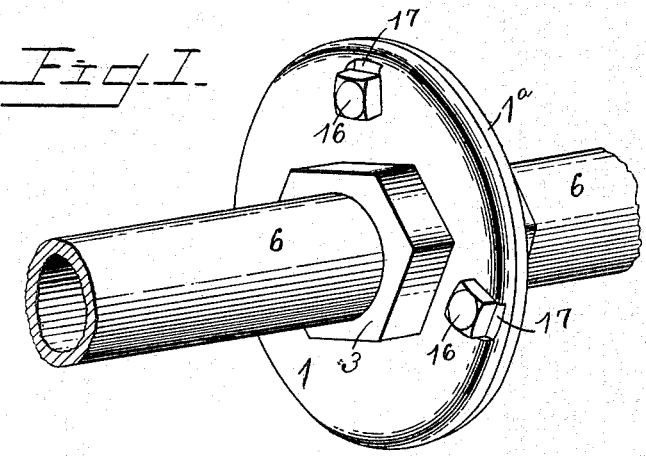
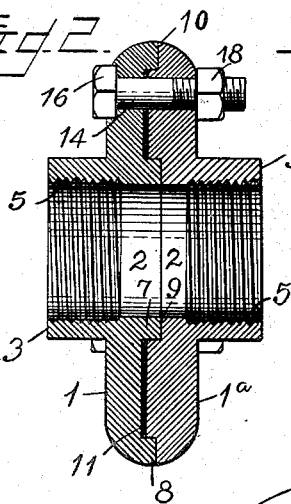 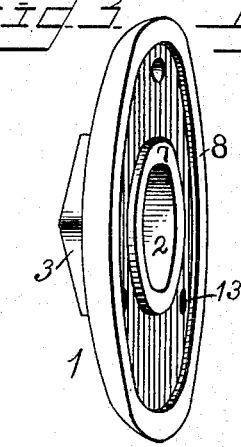 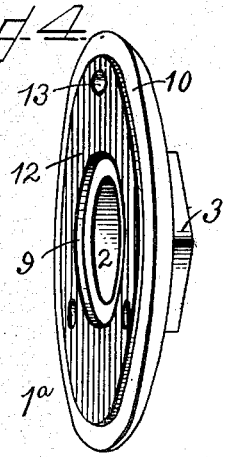
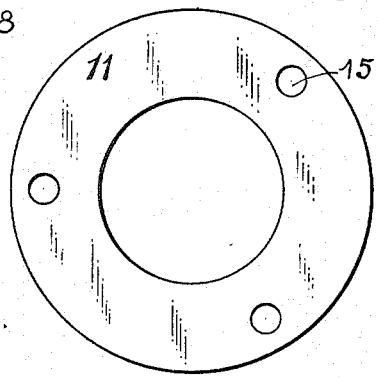
Witnesses
Chas. C. Fisher, Inventor
By his Attorneys,
THE NORRIS PETERS CO., PHOTO-LITHO., WASHINGTON, D. C.

UNITED STATES PATENT OFFICE.

CHARLES C. FISHER, OF WARREN, PENNSYLVANIA, ASSIGNOR TO CHARLES P. NORTHROP, OF SAME PLACE.

PIPE-COUPLING.

SPECIFICATION forming part of Letters Patent No. 661,506, dated November 13, 1900.

Application filed January 15, 1900. Serial No. 1,491. (No model.)

*To all whom it may concern:*

Be it known that I, CHARLES C. FISHER, a citizen of the United States, residing at Warren, in the county of Warren and State of Pennsylvania, have invented a new and useful Pipe-Coupling, of which the following is a specification.

The invention relates to improvements in pipe-couplings.

One object of the present invention is to improve the construction of pipe-couplings and to provide a simple, inexpensive, and efficient one of great durability adapted to permit the threaded ends of two pipes to be screwed entirely within it, whereby it is adapted to provide a tight joint and prevent leaks.

A further object of the invention is to reduce the weight to a minimum and to enable the thickened or enlarged pipe-receiving portions to be readily engaged by a wrench or similar tool, so that it may be securely held while a pipe is being screwed into it.

Another object of the invention is to arrange the fastening devices for connecting the plates or sections of the pipe-coupling so that they will support the gasket or packing in position and prevent its displacement and thereby obviate any liability of breaking the device through screwing one of the fastening devices tightly before the others are brought to substantially the same condition.

The invention consists in the construction and novel combination and arrangement of parts hereinafter fully described, illustrated in the accompanying drawings, and pointed out in the claim hereto appended.

In the drawings, Figure 1 is a perspective view of a pipe-coupling constructed in accordance with this invention. Fig. 2 is a sectional view of the same, taken longitudinally of one of the fastening devices. Figs. 3 and 4 are detail perspective views of the plates or sections. Fig. 5 is a detail view of the gasket or packing.

Like numerals of reference designate corresponding parts in all the figures of the drawings.

1 and 1ª designate substantially circular plates or sections having central openings 2 and provided on their exteriors with polygonal enlargements 3, having circular openings forming continuations of the openings 2 and provided with interior screw-threads 5, adapted to receive the threaded ends of pipes 6. The enlargements 3 increase the thickness of the plates or sections at the centers thereof and provide pipe-receiving sockets or openings of sufficient length to receive entirely the threaded ends of the pipes to be coupled, whereby such pipes may be screwed into the coupling sufficiently to form tight joints and to prevent leaks. The polygonal enlargements form wrench-receiving portions and are adapted to be gripped by a wrench or similar tool to enable the coupling to be held or rotated while a pipe is being screwed into the same.

The circular plate or section 1 is provided with concentric ribs 7 and 8, arranged at its inner face and rotated, respectively, at the center and periphery thereof. These ribs 7 and 8, which are adapted to fit in corresponding recesses or rabbets 9 and 10, form an intervening annular space for the reception of a circular gasket or packing 11, which may be constructed of any suitable material—such as lead, rubber, paper, or the like. The rabbets or recesses 9 and 10, which are annular, are located at the center and periphery of the circular plate or section 1ª and form a circular or annular projecting face 12, adapted to fit between the concentric ribs 7 and 8 and compress the gasket or packing, as clearly illustrated in Fig. 2 of the accompanying drawings. The annular ribs retain the gasket or packing in place and prevent any lateral movement of the same, as will be readily understood, and there is no liability of the gasket being blown out of the coupling when the latter is subjected to great pressure. The coupling is therefore adapted to be employed on steam and various other kinds of pipes or conduits for steam, liquids, and the like under high pressure.

The openings 2 adjacent to the inner faces of the plates or sections are smooth, as clearly shown in Fig. 2, and as the threads are cut into the bores or openings of the polygonal enlargements shoulders are provided at the outer edges of the smooth portions.

The plates or sections are provided at intervals with registering openings 13, receiving bolts or other suitable fastening devices and located at points between the concentric flanges, whereby the bolts 14 are adapted to pass through openings 15 of the gasket or packing to retain the latter in position and to prevent it from becoming displaced in assembling the parts. By arranging the fastening devices in this manner there is no liability of the sections becoming broken by reason of the displacement of the packing or gasket when one of the fastening devices is screwed or tightened in advance of the others. The bolts 14 are preferably provided with heads 16 of rectangular or other polygonal shape, and the outer face of the plate or section 1 is provided with recesses 17, conforming to the configuration of the heads 6 and forming seats for the same to lock the bolts against rotation when the nuts 18 are screwed on them.

It will be seen that the pipe-coupling is exceedingly simple and inexpensive in construction, that it possesses great strength and durability, and that it is especially adapted for oil, gas, steam, and similar pipes. It will also be apparent that the packing is securely held in place and that the enlargements perform the double function of forming wrench-receiving portions and of receiving entirely the threaded ends of pipes, whereby the coupling is easily handled and is adapted to afford tight joints.

What is claimed is—

A pipe-coupling comprising two circular plates arranged flat against each other and having central openings and provided with registering perforations and having polygonal enlargements 3 extending from their outer faces and interiorly threaded, one of the plates being provided at its inner face with concentric ribs 7 and 8 arranged at its inner and outer peripheries and forming an intervening annular space, the inner rib 7 being arranged in alinement with said enlargements 3 and provided with a smooth inner face and the other plate being provided at its inner and outer peripheries with annular recesses 9 and 10 receiving the said ribs 7 and 8 and forming an enlarged flat annular projecting portion 12, spaced from the inner and outer edges of the plate and fitting within the said annular space, the circular packing also arranged in the said annular space and provided with perforations registering with the said perforations, and the fastening devices passing through the said perforations and connecting the plates and forming supports for the packing, and adapted to retain the latter in proper position with relation to the ribs and the enlargements when the parts are being assembled or separated, substantially as described.

In testimony that I claim the foregoing as my own I have hereto affixed my signature in the presence of two witnesses.

CHARLES C. FISHER.

Witnesses:
E. H. BESHLIN,
C. P. NORTHROP.